United States Patent
Mattson (10) Patent No.: US 10,137,948 B2
(45) Date of Patent: *Nov. 27, 2018

(54) VEHICLE TRACK ASSEMBLY HAVING TRACK ROTATION INDICATOR POLE

(71) Applicant: David Owen Mattson, Chassell, MI (US)

(72) Inventor: David Owen Mattson, Chassell, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/491,129

(22) Filed: Apr. 19, 2017

(65) Prior Publication Data
US 2017/0217515 A1 Aug. 3, 2017

Related U.S. Application Data

(63) Continuation of application No. 14/487,612, filed on Sep. 16, 2014, now Pat. No. 9,676,430.

(51) Int. Cl.
| | |
|---|---|
| *B62D 55/084* | (2006.01) |
| *B62D 55/04* | (2006.01) |
| *B62D 55/28* | (2006.01) |
| *B62D 55/065* | (2006.01) |

(52) U.S. Cl.
CPC ........... *B62D 55/084* (2013.01); *B62D 55/04* (2013.01); *B62D 55/286* (2013.01); *B62D 55/065* (2013.01)

(58) Field of Classification Search
CPC ...... B62D 55/00; B62D 55/02; B62D 55/084; B62D 55/116; B62M 27/02; B62M 2027/022; B62B 13/18
See application file for complete search history.

(56) References Cited

U.S. PATENT DOCUMENTS

| | | | | |
|---|---|---|---|---|
| 2,634,928 A | * | 4/1953 | Hawes | B60Q 1/484 248/214 |
| 2,782,076 A | | 2/1957 | Miller | |
| 3,159,917 A | * | 12/1964 | Whitehead | B60D 1/36 116/28 R |
| 3,412,821 A | | 11/1968 | Humphrey | |
| 3,474,751 A | | 10/1969 | Hebert | |
| 3,765,703 A | * | 10/1973 | Voelkerding | B60D 1/36 116/28 R |
| 3,844,050 A | * | 10/1974 | Lynn | B60R 99/00 116/28 R |
| 3,858,966 A | * | 1/1975 | Lowell, Jr. | B60D 1/36 116/28 R |

(Continued)

FOREIGN PATENT DOCUMENTS

| | | |
|---|---|---|
| CA | 2191008 C | 10/1997 |
| CA | 2282787 A1 | 5/2000 |

(Continued)

*Primary Examiner* — Frank B Vanaman
(74) *Attorney, Agent, or Firm* — Price Heneveld LLP (57) ABSTRACT

A vehicle track assembly includes a track framework including a frame structure, a drive drum, and a plurality of idler wheels supported by the frame structure. A drive track is arranged about and cooperatively engages the plurality of idler wheels and the drive drum. An adjustable ski is connected to the framework. The ski may extend forward of the track. An adjustable rearward extending ski may extend rearward of a track assembly. An indicator pole is coupled to the assembly to provide an indication of the angle of rotation of the assembly.

13 Claims, 9 Drawing Sheets

(56) References Cited

U.S. PATENT DOCUMENTS

| | | | |
|---|---|---|---|
| 3,863,594 A * | 2/1975 | Gawthrop | B60P 3/10 116/28 R |
| 4,313,516 A | 2/1982 | Terry | |
| 4,666,176 A * | 5/1987 | Sand | B60D 1/36 280/477 |
| 4,958,436 A | 9/1990 | Tusche | |
| 5,607,210 A | 3/1997 | Brazier | |
| 5,860,486 A | 1/1999 | Boivin et al. | |
| 6,112,840 A | 9/2000 | Forbes | |
| 6,234,263 B1 | 5/2001 | Boivin et al. | |
| 6,234,264 B1 | 5/2001 | Boivin et al. | |
| 6,467,561 B1 | 10/2002 | Boivin et al. | |
| 6,478,098 B2 | 11/2002 | Boivin et al. | |
| 6,505,896 B1 | 1/2003 | Boivin et al. | |
| 6,874,586 B2 | 4/2005 | Boivin et al. | |
| D612,766 S | 3/2010 | Boivin | |
| 2003/0159859 A1 | 8/2003 | Boivin et al. | |
| 2005/0133281 A1 | 6/2005 | Boivin et al. | |
| 2006/0060395 A1 | 3/2006 | Boivin et al. | |
| 2010/0059321 A1 | 3/2010 | Boivin | |
| 2011/0254363 A1 | 10/2011 | Boivin | |
| 2013/0221738 A1 | 8/2013 | Boivin | |
| 2014/0332298 A1 | 11/2014 | Girouard et al. | |

FOREIGN PATENT DOCUMENTS

| | | |
|---|---|---|
| CA | 2260192 A1 | 7/2000 |
| CA | 2271402 A1 | 7/2000 |
| CA | 2317932 A1 | 11/2000 |
| CA | 2281341 A1 | 3/2001 |
| CA | 2317223 A1 | 3/2001 |
| CA | 2728865 A1 | 10/2001 |
| CA | 2358154 A1 | 4/2002 |
| CA | 2372949 A1 | 8/2003 |
| CA | 2388294 A1 | 8/2003 |
| CA | 2822562 A1 | 8/2003 |
| CA | 2825509 A1 | 8/2003 |
| CA | 2509440 A1 | 12/2005 |

* cited by examiner

VEHICLE TRACK ASSEMBLY HAVING TRACK ROTATION INDICATOR POLE

CROSS-REFERENCE TO RELATED APPLICATION

This application is a continuation of U.S. patent application Ser. No. 14/487,612 filed Sep. 16, 2014, entitled "VEHICLE TRACK ASSEMBLY," now issued as U.S. Pat. No. 9,676,430. The aforementioned related application is hereby incorporated by reference.

FIELD OF THE INVENTION

The present invention generally relates to motorized vehicle track assemblies, and more particularly relates to an all-terrain track assembly for use on a ground driven vehicle for use on off-road terrain.

BACKGROUND OF THE INVENTION

All-terrain track assemblies have been developed for motorized vehicles to enable a vehicle to be converted from a four-wheel drive automotive vehicle to an all-terrain vehicle. Each wheel of the vehicle may be replaced with such a track assembly to enable the vehicle to travel over soft ground terrain including snow and mud covered surfaces. While conventional track assemblies generally provide a large ground surface footprint and enhanced traction, it would be desirable to provide for an improved track assembly that allows for enhanced use in deep snow and soft mud covered terrain.

SUMMARY OF THE INVENTION

According to one aspect of the present invention, a vehicle track assembly is provided. The vehicle track assembly includes a track framework having a frame structure, a drive drum, and a plurality of idler wheels supported by the frame structure. The vehicle track assembly also includes a drive track arranged about and cooperatively engaging the plurality of idler wheels and the drive drum. The vehicle track assembly further includes an adjustable ski connected to the framework and extending forward of the track, wherein the ski is adjustable to a select inclination angle.

According to another aspect of the present invention, a vehicle track assembly is provided. The vehicle track assembly includes a track framework including a frame structure, a drive drum, and a plurality of idler wheels supported by the frame structure and a drive track arranged about and cooperatively engaging the plurality of idler wheels and the drive drum. The vehicle track assembly also includes a ski connected to the framework and extending adjacent to the track. The ski includes at least one mounting arm connected to at least one of the idler wheels.

According to a further aspect of the present invention, a vehicle track assembly is provided. The vehicle track assembly includes a track framework comprising a frame structure, a drive drum, and a plurality of idler wheels supported by the frame structure. The vehicle track assembly also includes a drive track arranged about and cooperatively engaging the plurality of idler wheels and the drive drum. The vehicle track assembly further includes an indicator pole extending from the framework to provide an indication of the angle of rotation of the track assembly.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
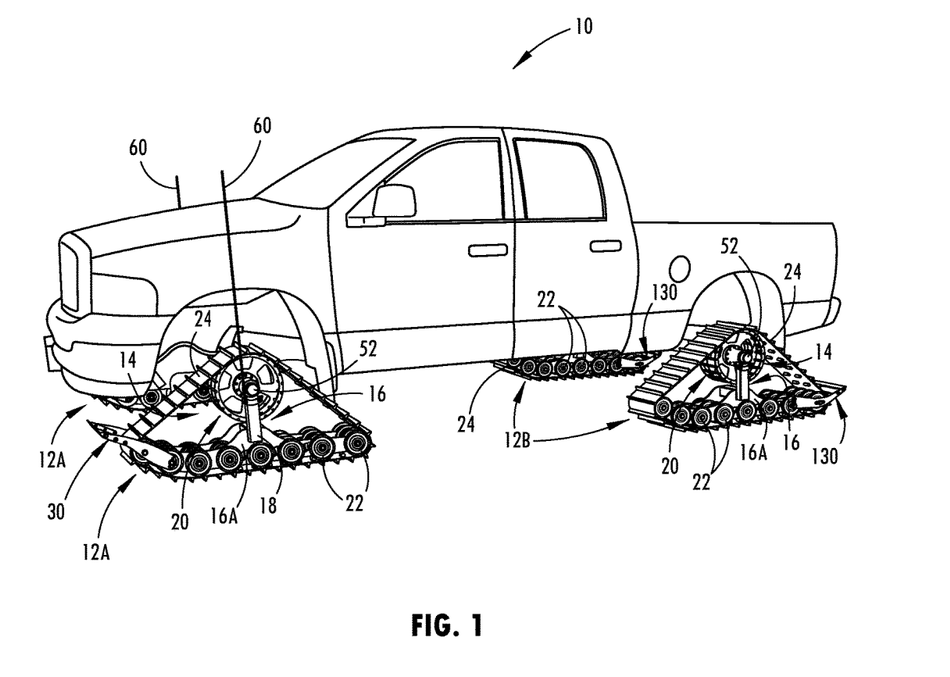
FIG. 1 is a perspective view of a four-wheel drive vehicle equipped with four track assemblies, according to one embodiment.
Figure 2:
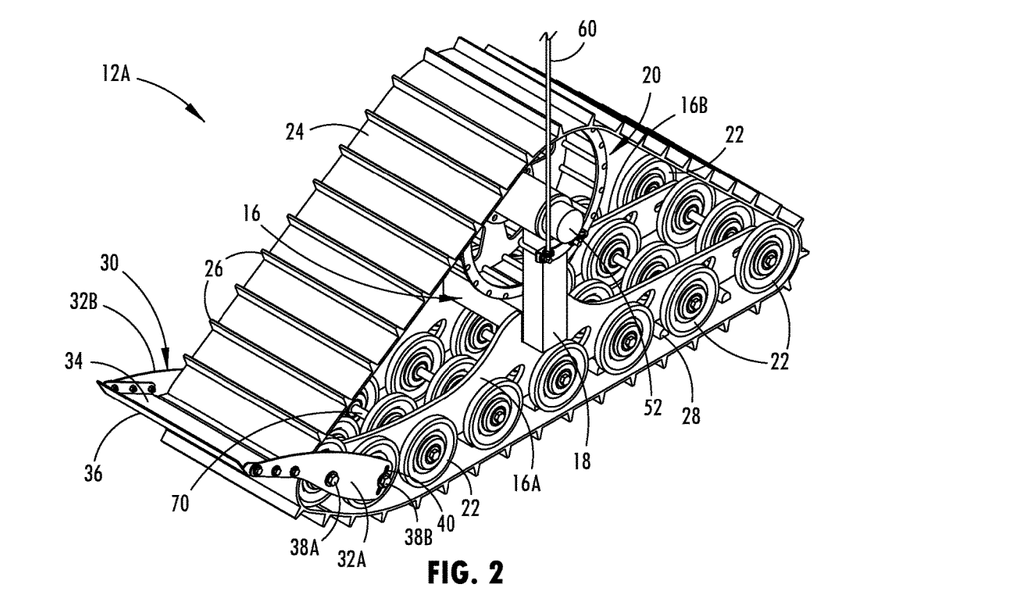
FIG. 2 is a front perspective view of one of the front side track assemblies shown in FIG. 1.

For purposes of description herein, the terms "upper," "lower," "right," "left," "rear," "front," "vertical," "horizontal," and derivatives thereof shall relate to the vehicle and track assembly as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a four-wheel drive vehicle 10 is generally illustrated equipped with four endless track assemblies 12, shown and described herein as front track assemblies 12A mounted to the front drive shafts or axles and rear track assemblies 12B mounted to the rear drive shaft or axles, according to one embodiment. Each of the track assemblies 12A and 12B is supported on a drive shaft or axle of the vehicle 10 and may be connected thereto via lug bolts (not shown) that extend from a backing plate or wheel hub of the vehicle. The vehicle 10 may be a four-wheel drive vehicle in which power may be independently provided to each track assembly. For a two-wheel drive vehicle, power may be applied to only the front or rear track assemblies. The vehicle 10 may be a four-wheel drive vehicle having four drive shafts or axles that are power driven, and each connected to a different track assembly. In other embodiments, more or less track assemblies may be provided. Each of the front and rear track assemblies 12A and 12B may be driven via the vehicle powertrain to enable the vehicle to more effectively travel on soft ground terrain. It should be appreciated that the vehicle 10 may be converted from a wheel configured vehicle in which the road wheels and tires are removed to the track configured vehicle in which the track assemblies 12A and 12B are assembled to the vehicle 10. The track assemblies 12A and 12B may be used on road vehicles, all-terrain vehicles (ATV), utility terrain vehicles (UTV) and tractor type vehicles such as snow grooming machines.

Figure 2A:
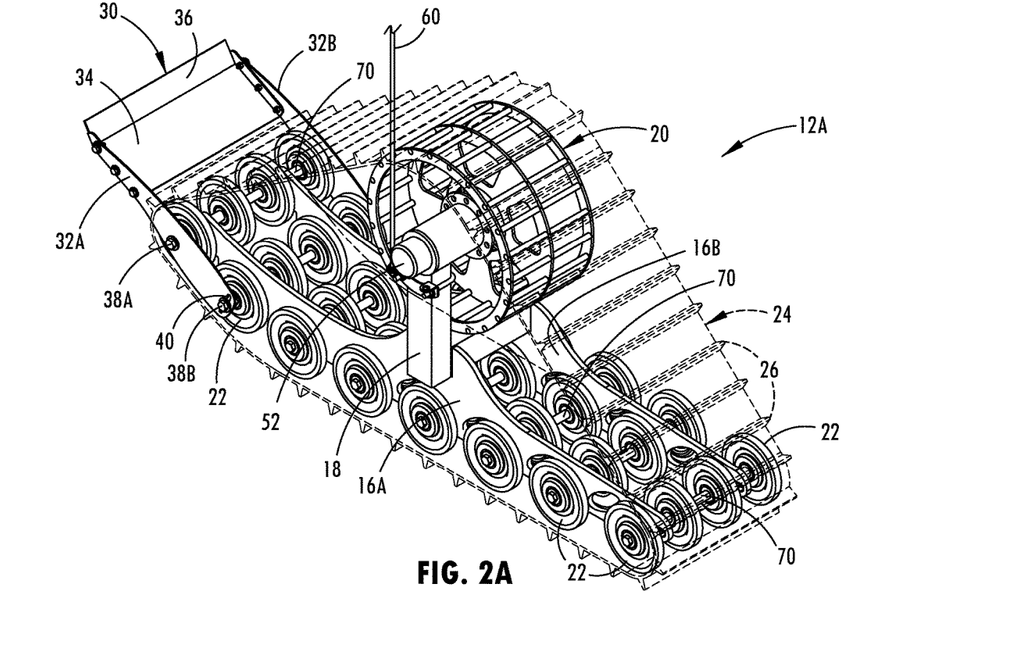
FIG. 2A is a rear perspective view of the front side track assembly shown in FIG. 2, with the track shown hidden in phantom.
Figure 3:
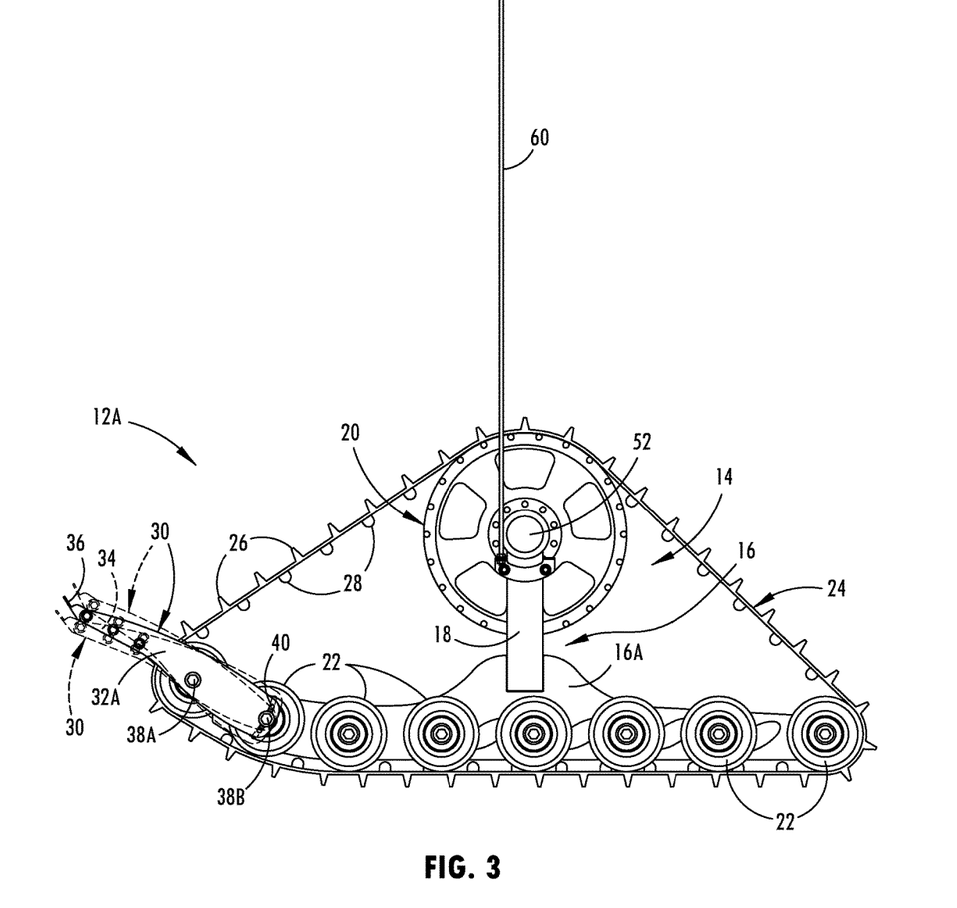
FIG. 3 is a side view of the front side track assembly illustrating the forward extending adjustable ski in a plurality of selectable angled positions.
Figure 4:
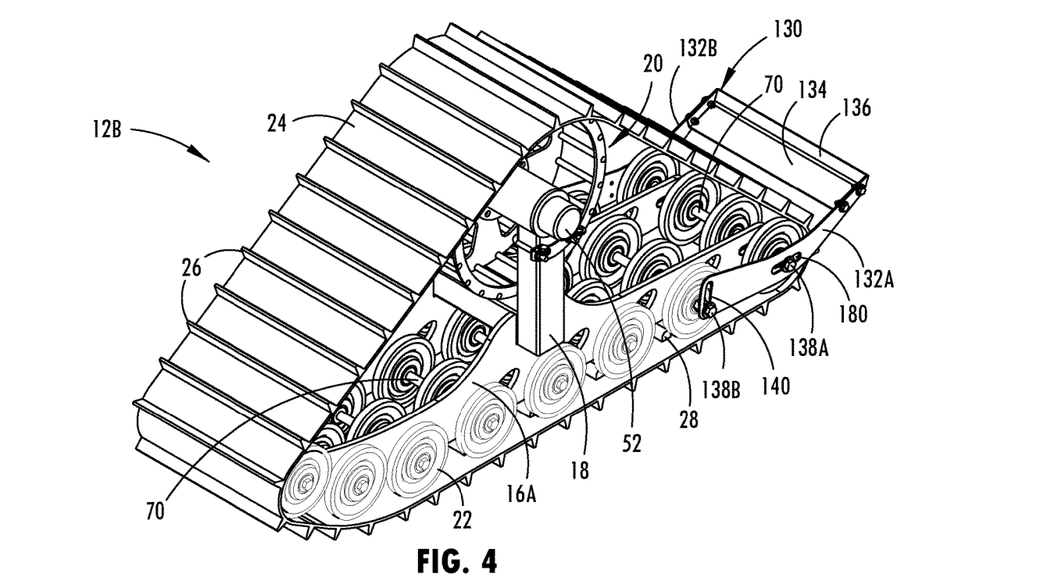
FIG. 4 is a front perspective view of one of the rear side track assemblies shown in FIG. 1.
Figure 4A:
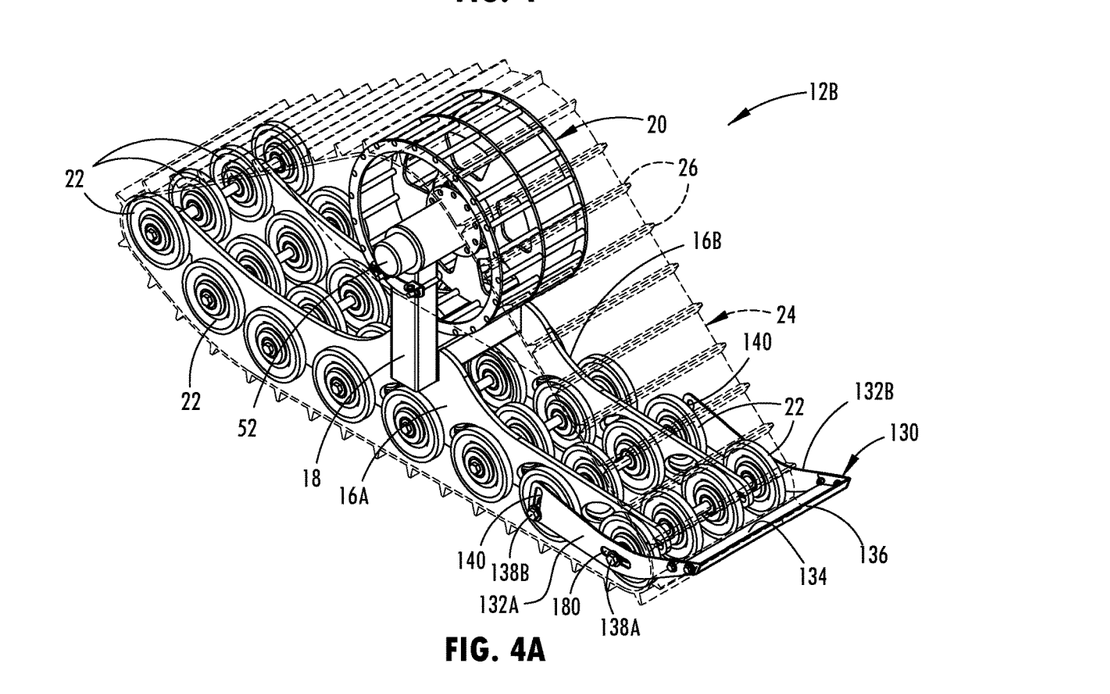
FIG. 4A is a rear perspective view of the rear side track assembly shown in FIG. 4, with the drive track shown hidden in phantom.
Figure 5:
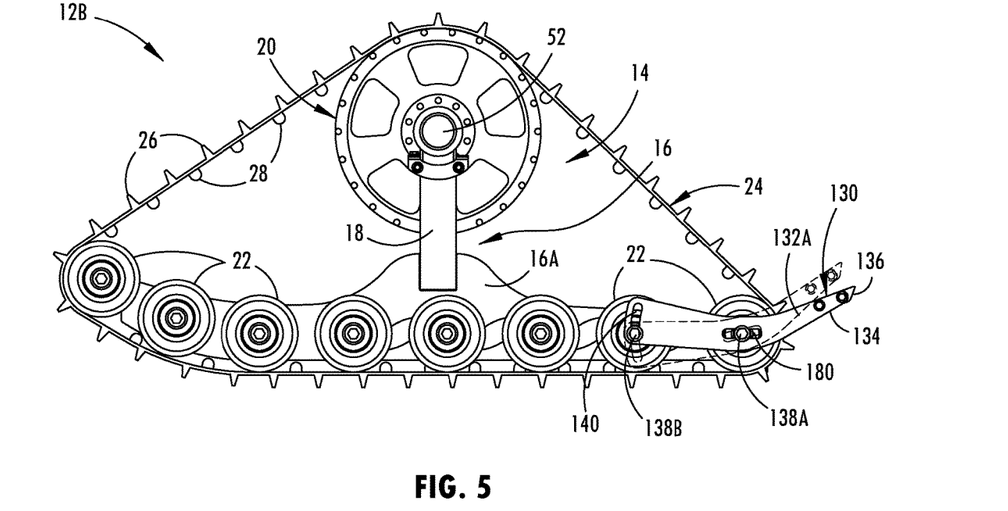
FIG. 5 is a side view of the rear side track assembly illustrating the rearward extending adjustable ski in a plurality of selectable angled positions.

Each of the track assemblies 12A and 12B is shown configured in a generally triangular configuration. The front track assembly 12A is shown in FIGS. 2, 2A and 3 having a forward extending ski 30 and an indicator pole 60. The rear track assembly 12B is shown in FIGS. 4, 4A and 5 having a rearward extending ski 130. The track assemblies 12A and 12B each include a track framework 14 which generally includes a frame structure 16, a drive drum 20 and a plurality of idler wheels 22 supported by the frame structure 16. In one embodiment, the frame structure 16 generally includes an L-shaped frame member 18 having a vertical extending support member (e.g., a bar) and a horizontal bottom connecting support member (e.g., a bar) and a pair of generally horizontally extending ski rails or frame members 16A and 16B. The pair of horizontally extending ski frame members 16A and 16B connect to frame member 18 which, in turn, is connected to a bearing housing 52 that connects to a hub at the end of the vehicle drive shaft.

The drive drum 20 is operatively connected to the drive shaft of the vehicle and essentially replaces the road wheel and tire assembly when employed on a wheel type vehicle. The drive drum 20 rotates and may be powered via the vehicle drivetrain. The drive drum 20 may include a plurality of spaced bars for engaging inner lugs on a drive track 24 to actuate the track 24 in a desired direction. The drive drum 20 transfers rotational movement of the drive shaft to rotational movement of the track 24 to move the vehicle forward or backward via ground traction.

Figure 6:
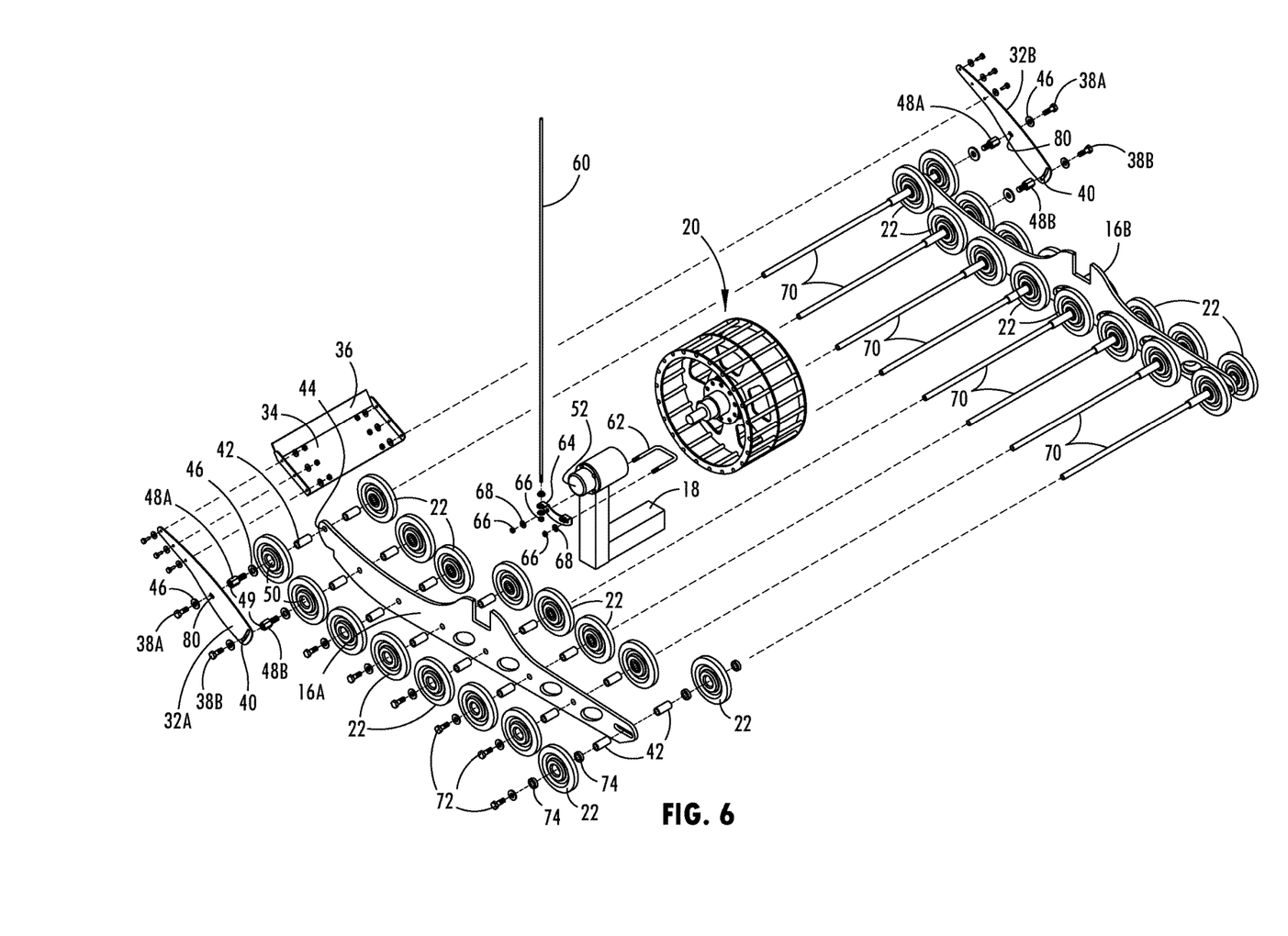
FIG. 6 is an exploded view of one of the front side track assemblies shown in FIG. 1.

The plurality of idler wheels 22 are generally connected to the frame structure 16 via the ski frame rails 16A and 16B. In the embodiment shown, four rows of eight idler wheels 22 are connected to the ski frame rails 16A and 16B via stub axles 70 which extend through control openings 50 in each idler wheel 22 and openings 44 in the ski frame rails 16A and 16B as illustrated in FIG. 6. Each stub axle 70 supports a plurality of idler wheels 22 and includes bearings 74, bushings 42, and threaded fasteners (e.g., screws) 72 to retain each idler wheel 22 to the axle 70. The idler wheels 22 are also referred to as bogie wheels and may include plastic or rubber wheels that allow the drive track 24 to rotate about the track framework 14.

The drive track 24 is arranged about and cooperatively engages the plurality of idler wheels 22 and drive drum 20. The drive track 24 is an endless track that wraps around and thereby circumscribes the framework 14. The drive track 24 may be configured as a belt and may be made of plastic or rubber. The track 24 includes outward extending lugs 26 that enable tractive engagement of the ground surface on the bottom outer side with enhanced friction and enhanced traction, and a plurality of inward extending lugs 28 that enhance engagement with spaced bars on the drive drum 20 on the inside to enable the drive drum 20 to drive the track 24 in a desired direction. The track 24 engages and is driven by the drive drum 20 and further engages the idler wheels 22.

The front track assemblies 12A each include an adjustable forward extending ski 30 connected to the framework 16 and extending forward of the drive track 24. The forward extending ski 30 is connected to at least one of the front rows of idler wheels 22, particularly to the forwardmost and second forwardmost stub axles 70 of idler wheels 22 that centrally support the idler wheels 22. The ski 30 is adjustable to a select inclination angle. As such, the inclination angle of the ski 30 may be adjusted amongst a plurality of positions. The inclination angle may be selected by a user to accommodate the ground driving conditions. The ski 30 enables the track assembly 12A to ride up on top of heavy snow, mud or other soft terrain and further enables the vehicle 10 to float on the snow, mud and other soft terrain with enhanced driving performance. In the embodiment shown, the ski 30 includes a main portion 34 shown as a generally planar member connected at a forward edge to an upward extending lip 36 that forms a tip. According to one embodiment, the inclination angle of the main portion 34 is adjustable in the range of 15 degrees to 45 degrees relative to the horizontal bottom of the track assembly 12A. The lip 36 may extend upward further at an angle of about 30 degrees relative to the main portion 34. As such, the lip has an angle of about 45 degrees to 75 degrees relative to the horizontal bottom of the track assembly 12A. The main portion 34 has a shape and size that allows the vehicle 10 to float over soft ground terrain. The lip 36 further enables the vehicle 10 to prevent the ski 30 from digging into the ground. The main portion 34 and lip 36 each may have other planar or non-planar shapes and sizes according to other embodiments.

Figures 8, 9:
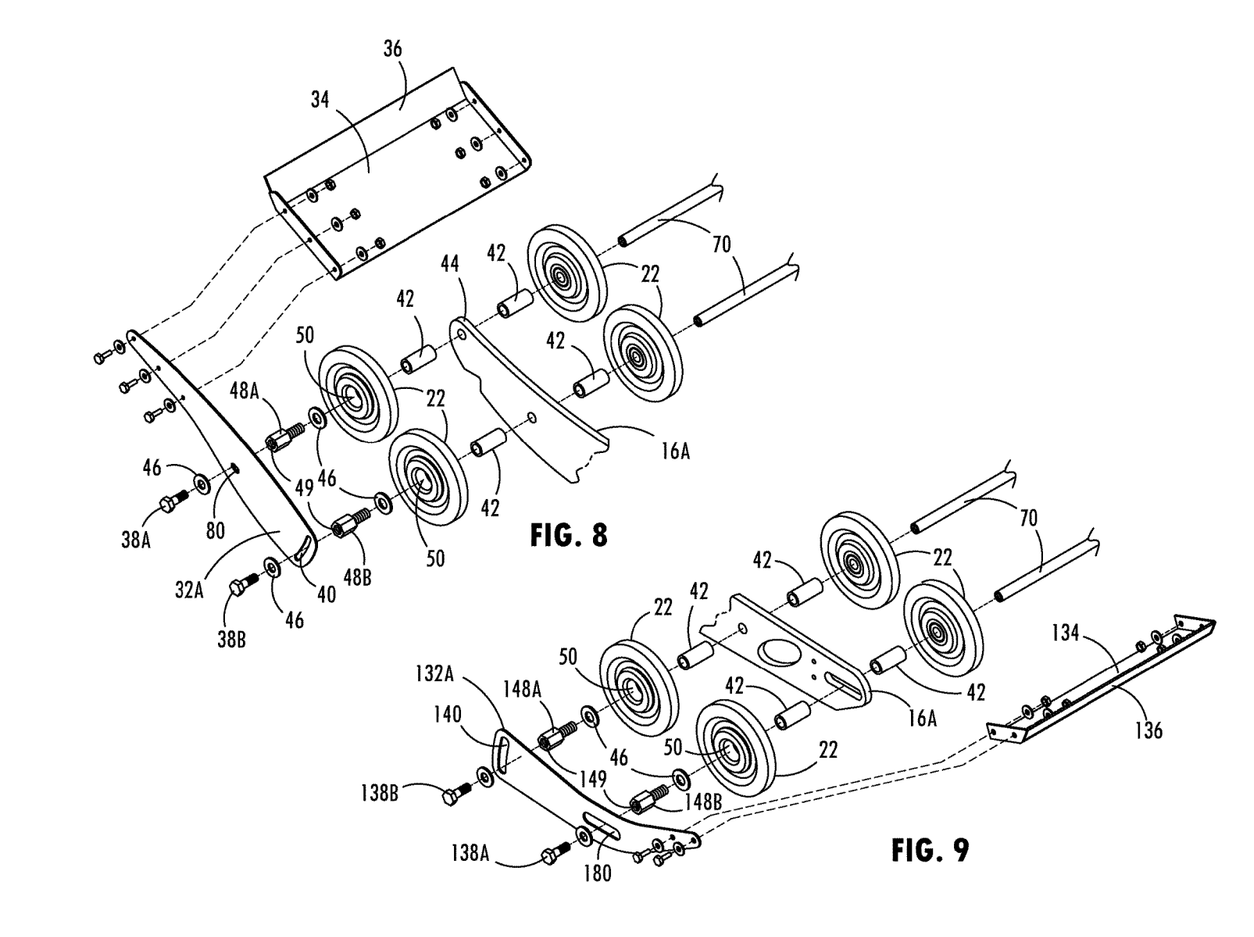
FIG. 8 is an exploded view of a front portion of the front side track assembly showing the forward extending ski assembled to the idler wheels.
FIG. 9 is an exploded view of a rear portion of the rear side track assembly showing the rear extending ski assembled to the idler wheels.

The forward extending ski 30 is supported by the framework 14 on opposite left and right sides via side mounting arms 32A and 32B. The ski 30 is fastened via the mounting arms 32A and 32B to opposite ends of the first and second forwardmost idler wheel axles 70 extending through the two forwardmost rows of idler wheels 22. The idler wheels 22 are connected to stub axles 70 via threaded fasteners 72 and washers 46. As shown in FIG. 8, threaded fasteners 48A and 48B, such as bolts, employed on opposite ends of the two forwardmost axles 70 are configured to include internal threading 49 on the distal ends of the fasteners 48A and 48B and adapted to receive threaded ski mounting fasteners 38A and 38B such as screws. The forwardmost ski mounting fastener 38A extends through a first opening 80 in the support arm 32A. The secondmost forward ski mounting fastener 38B extends through an elongated slot 40 in support arm 32A. The elongated slot 40 generally extends vertically and allows for vertical adjustment of the rear end of the mounting arms 32A and 32B so as to change the inclination angle of the ski 30. The ski mounting fasteners 38A and 38B may be configured as shear pin bolts designed to break when a large object collides with the ski 30. Accordingly, a user may loosen ski mounting fasteners 38A and 38B on opposite ends of stub axles 70 and may rotate the mounting arms 32A and 32B and hence the ski 30 to a desired inclination angle to select the inclination angle of the ski 30, and then may retighten ski mounting fasteners 38A and 38B when the desired inclination angle is achieved. Accordingly, the ski 30 is advantageously mounted to the idler wheels 22 at stub axles 70 and allows for selection of an inclination angle to provide enhanced performance for the track assembly 12A. It should be appreciated that the ski 30 may otherwise extend adjacent to the track 24 and may be connected to other idler wheels 22 and stub axles 70, according to other embodiments.

The ski 30 is shown in FIGS. 6 and 8 having the main portion 34 fastened to mounting arms 32A and 32B and tip 36 is formed as part of the main portion 34. However, it should be appreciated that the main portion 34 may be otherwise connected to or formed with mounting arms 32A and 32B and the tip 36 may otherwise be connected to the main portion 34 or not employed, according to other embodiments.

The adjustable ski 30 advantageously provides for enhanced floatation of the track assembly 12A in deep snow and other soft terrain. The adjustable ski 30 is angled upward in the forward direction to allow the ski to rise up on top of soft terrain and to further serve as a trim tab which advantageously controls the stability of the track assembly 12A when traveling forward over deep snow, mud or other soft terrain conditions. The adjustability of the ski 30 also allows for achievement of optimal performance of the track assembly 12A by enabling a user to provide the optimal inclination angle of the ski 30. The optimum inclination angle may vary based on vehicle type, vehicle weight, snow conditions, snow depth, degree of grade and other factors. If the vehicle 10 is about to climb over a very steep embankment and the inclination angle of the adjustable ski 30 is too gradual, the ski 30 may cut into the embankment and thereby prevent or slow forward movement and may experience a potential over rotation of the track assembly. If the mounting angle of the ski 30 is too steep and the vehicle 10 is traveling over deep soft snow, the adjustable ski 30 may not be positioned at a gradual enough angle to provide optimal floating. Accordingly, the adjustability of the ski 30 allows a user to adapt to the vehicle and terrain conditions to achieve optimum driving performance.

The rear track assembly 12B is shown configured with an adjustable rearward extending ski 130 connected to framework 14 and extending rearward of the track assembly 12B, according to one embodiment. The ski 130 is angled upward in the rearward direction which assists with backing out of treacherous terrain to prevent rear skis 130 from nose diving. It should be appreciated that the rear track assembly 12B may be configured the same as or substantially similar to the front track assembly 12A, with the exception that the forward extending ski 30 on the front side of the assembly is replaced with the rearward extending ski 130 on the rear side of the track assembly. As shown in FIG. 9, the rearward extending ski 130 includes a main portion 134 shown as a substantially planar sheet connected to an upward extending lip 136 on the rear side. The rearward extending ski 130 further has a pair of mounting arms 132A and 132B on opposite left and right sides that connect to opposite ends of the two rearwardmost stub axles 70 and idler wheels 22. The mounting arms 132A and 132B are each configured to include a first opening 180 and a second opening 140. The first opening 180 includes a longitudinal slot that allows for adjustment of the rearward most idler wheels 22 to set the track tension. The second opening 140 is a vertically extending slot that allows for adjustment of the rearward extending ski 130 to a desired inclination angle. An operator may loosen the first and second threaded fasteners (e.g., bolts) 138A and 138B on opposite ends of the stub axles 70 and may adjust the inclination angle of the rearward extending ski 130 by moving the mounting arms 132A and 132B relative to slot 140. The inclination angle may be adjusted amongst a plurality of positions. According to one embodiment, the inclination angle of the main portion 134 of the rearward extending ski 130 is adjustable in the range of 15 degrees to 45 degrees relative to the horizontal bottom of the track assembly 12B. The lip 136 may extend further at an angle in the range of about 50 degrees relative to the main portion 134. The lip 136 extends at an angle of 65 degrees to 85 degrees relative to the horizontal bottom of the track assembly 12B. When the desired inclination angle is achieved, fasteners 138A and 138B may be tightened to fixedly maintain the selected angle. It should be appreciated that threaded fasteners 138A and 138B may likewise be threaded into internal threads 149 provided on the outer distal ends of threaded fasteners 148A and 148B (e.g., bolts) on stub axles 70 similar to the fastener arrangement described herein for the forward extending ski 30. It should be appreciated that the rearward extending ski 130 may be connected to more or less idler wheels 22, according to other embodiments.

Accordingly, the forward mounted adjustable ski 30 provided on the front track assemblies 12A and the rearward mounted adjustable ski 130 provided on the rear track assemblies 12B advantageously provide for enhanced floatation of the vehicle 10 when traveling through soft terrain such as deep snow and mud. The front ski 30 and rear ski 130 enable the vehicle 10 to rise up onto and float over the deep snow or mud when traveling in the forward and rearward directions. In addition, the front ski 30 and rear ski 130 enable the vehicle to provide enhanced stability when traveling over soft terrain. By enabling the adjustment of the front ski 30 and the rear ski 130, the desired tuning for stability control of the vehicle 10 may be achieved, and with proper tuning for any given conditions track assembly over rotation may be avoided. The forward extending ski 30 has a larger surface area than the surface area of the rearward extending ski 130 according to the embodiment shown. However, it should be appreciated that different size front and rear skis 30 and 130 may be employed.

The front track assemblies 12A are further shown each having an indicator pole 60 extending from the framework 14 to provide an indication of the angle of articulation or rotation of each track assembly 12A. The indicator pole 60 is generally positioned extending upright in a vertical position when the track assembly 12A is in a generally horizontal position on a horizontal surface as shown in FIG. 1. In this position, the indicator pole 60 is readily viewable and provides an indication to the driver of the vehicle 10 that the track assembly 12A is in a generally horizontal position. As the track assembly 12A articulates and thereby rotates forward or rearward due to the ground terrain, the indicator pole 60 will rotate forward or rearward, respectively, to provide an indication of the angle of forward or rearward rotation. As such, the driver of the vehicle may view the indicator pole 60 and determine when the vehicle may potentially experience an over rotation of the front track assembly 12A. This may enable the driver to stop the vehicle, slow the vehicle, or steer the vehicle in a more suitable path to prevent excessive over rotation of the track assembly 12A. The indicator pole 60 may also serve to provide the driver with feedback to enable the driver to decide to adjust the inclination angle of the front and/or rear skis 30 and 130.

Figure 7:
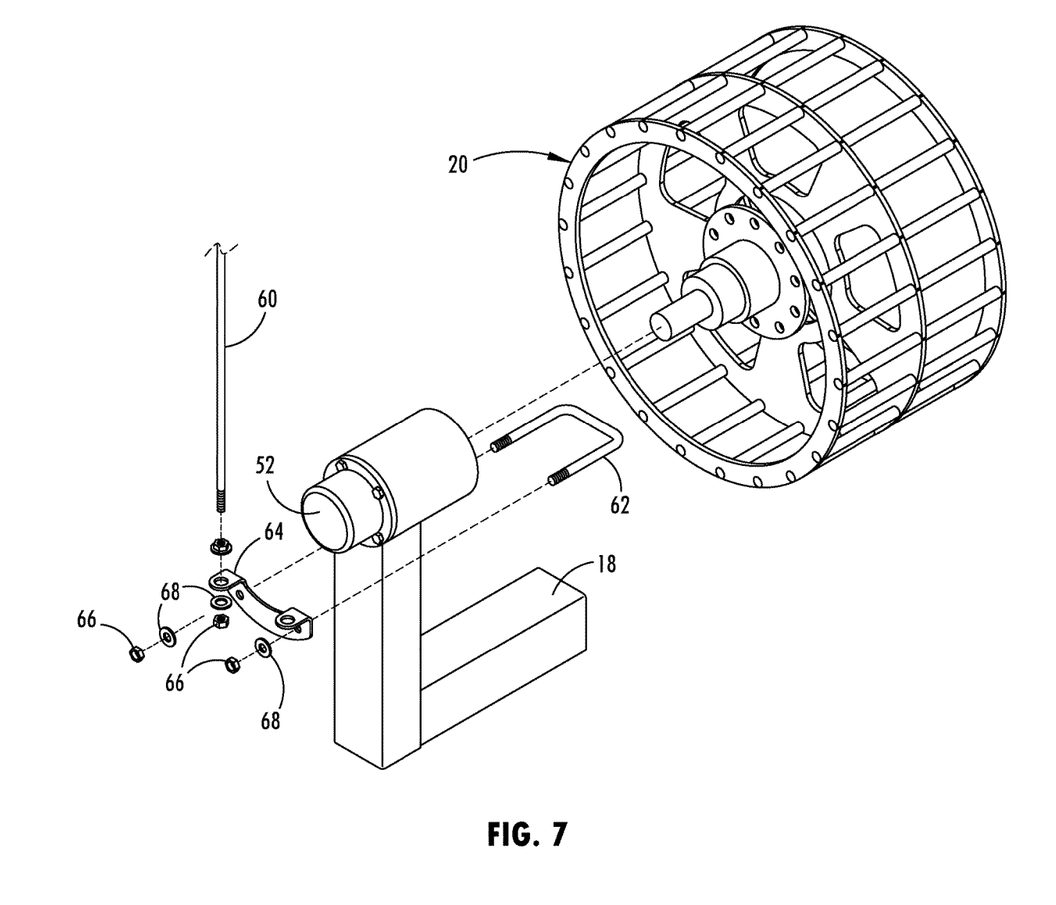
FIG. 7 is an enlarged exploded view of the indicator pole attached to the track frame structure.

The indicator pole 60 shown is in one embodiment mounted to the frame structure 16, particularly onto the vertical post of frame member 18 as seen in FIG. 7. The indicator pole 60 may be mounted using a bracket 62 that extends around and engages frame member 18 and is fastened onto plate 64 via fasteners 66 and washers 68. Additionally, the indicator pole 60 may be threaded at the bottom end and engaged onto a nut 66 in its vertical position as shown. It should be appreciated that the indicator pole 60 may be connected to other structures on the track framework 14 to provide an indication of the angle of articulation or rotation of the track assembly 12A.

The indicator pole 60 advantageously allows the driver of the vehicle 10 to identify the relative position of the front track assemblies 12A which is particularly useful when the vehicle is traveling over treacherous terrain or changing between different types of terrain. The indicator pole 60 is preferably configured to be vertical or slightly angled back. If the angle of the front skis 30 need adjustment, the indicator pole 60 will be tipped forward or backward outside of the normal vertical range. The indicator pole 60 can help prevent a track assembly 12A from over rotating by alerting the driver of the vehicle that a track assembly 12A is nearing an angle of rotation limit. At that point, the driver can stop the vehicle to prevent the track assembly 12A from rotating any further. The driver can further adjust the inclination angle of the skis 30 or 130 to enhance the performance of the track assemblies 12A and 12B on the given terrain.

Figure 10:
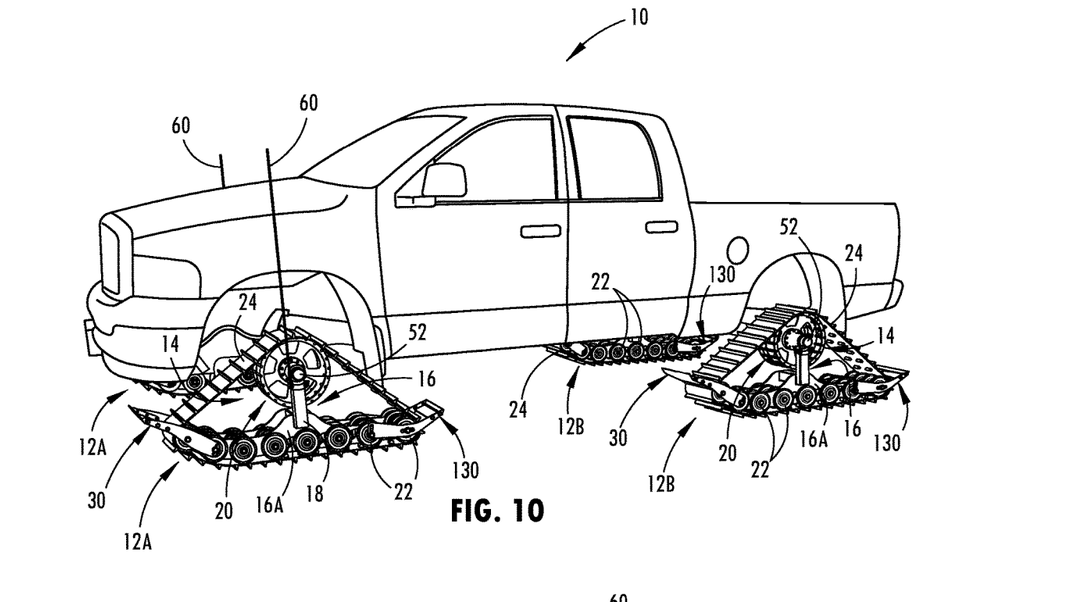
FIG. 10 is a perspective view of a four-wheel drive vehicle equipped with four vehicle track assemblies each having adjustable forward and rearward extending skis, according to another embodiment.
Figure 11:
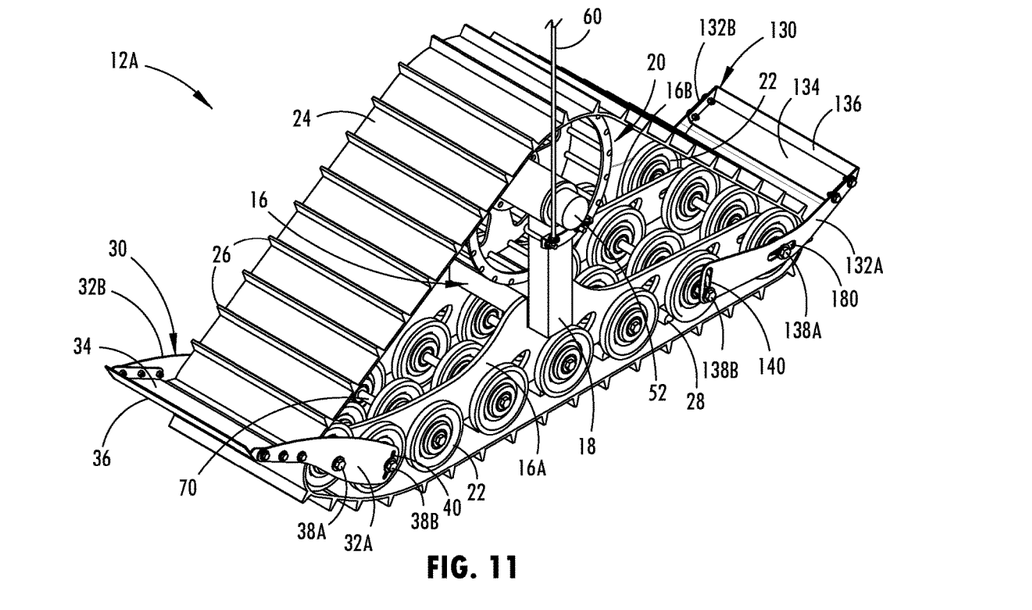
FIG. 11 is a front perspective view of one of the track assemblies shown in FIG. 10.

Referring to FIGS. 10 and 11, a vehicle 10 is generally illustrated having four track assemblies 12A and 12B each configured with a forward extending ski 30 and a rearward extending ski 130, according to another embodiment. In this embodiment, the track assemblies 12A and 12B are each configured to have the adjustable forward extending ski 30 as shown in FIG. 2 and the adjustable rearward extending ski 130 as shown in FIG. 4. Each of the adjustable skis 30 and 130 are connected to the track framework 14 and are adjustable to a selectable inclination angle as described above in connection with the embodiment shown in FIGS. 1-6.

Accordingly, the vehicle track assemblies 12A and 12B advantageously provide for enhanced performance of an all-terrain vehicle 10, particularly when operating in deep snow, mud and other soft terrain conditions. Additionally, the track assemblies 12A and 12B advantageously allow the vehicle 10 to provide enhanced stability in forward and rearward progression of the vehicle in such conditions. Further, the indicator pole 60 advantageously allows for the vehicle driver to receive an indication of a potential excessive angle of rotation of the corresponding track assembly.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle track assembly comprising:
a track framework comprising a frame structure, a drive drum configured to connect to a shaft on a vehicle, and a plurality of idler wheels supported by the frame structure;
a drive track arranged about and cooperatively engaging the plurality of idler wheels and the drive drum; and
an indicator pole connected to the frame structure approximately at a center of the drive drum and extending from the framework, wherein the indicator pole rotates with angular rotation of the track assembly with respect to the vehicle to provide an indication of the angle of rotation of the track assembly, wherein the indicator pole rotates forward or rearward as the track assembly rotates forward or rearward, respectively.

2. The track assembly of claim 1, wherein the indicator pole is generally vertical when the track assembly is in a generally horizontal position on a horizontal surface.

3. The track assembly of claim 1, further comprising a ski having at least one mounting arm extending from the framework, wherein the ski is an adjustable ski that is adjustable amongst a plurality of inclination angles to an angle of inclination.

4. The track assembly of claim 3, wherein the at least one mounting arm has first and second mounting holes, wherein one of the first and second mounting holes has an elongated slot that allows the ski to be rotated to adjust the inclination angle.

5. A vehicle track assembly comprising:
a track framework comprising a frame structure, a drive drum, and a plurality of idler wheels supported by the frame structure, wherein the track framework is configured to connect to a shaft on a vehicle such that the vehicle track assembly rotates on the shaft;
a drive track arranged about and cooperatively engaging the plurality of idler wheels and the drive drum; and
an indicator pole connected to the frame structure and extending from the framework, wherein the indicator pole rotates forward or rearward with angular rotation of the track assembly as the track assembly rotates forward or rearward, respectively, to provide an indication of the angle of rotation of the track assembly.

6. The track assembly of claim 5, wherein the indicator pole is connected to the frame structure approximately at a center of the drive drum.

7. The track assembly of claim 5, wherein the indicator pole is generally vertical when the track assembly is in a generally horizontal position on a horizontal surface.

8. The track assembly of claim 5, further comprising a ski having at least one mounting arm extending from the framework, wherein the ski is an adjustable ski that is adjustable amongst a plurality of inclination angles to an angle of inclination.

9. The track assembly of claim 8, wherein the at least one mounting arm has first and second mounting holes, wherein one of the first and second mounting holes has an elongated slot that allows the ski to be rotated to adjust the inclination angle.

10. A vehicle track assembly comprising:
a track framework comprising a frame structure, a drive drum, and a plurality of idler wheels supported by the frame structure, wherein the track framework is configured to connect to a drive shaft on a vehicle such that the vehicle track assembly rotates on the drive shaft;
a drive track arranged about and cooperatively engaging the plurality of idler wheels and the drive drum; and
an indicator pole connected to the frame structure approximately at a center of the drive drum and extending from the framework, wherein the indicator pole rotates with angular rotation of the track assembly to provide an indication of the angle of rotation of the track assembly, wherein the indicator pole rotates forward or rearward as the track assembly rotates forward or rearward, respectively.

11. The track assembly of claim 10, wherein the indicator pole is generally vertical when the track assembly is in a generally horizontal position on a horizontal surface.

12. The track assembly of claim 10, further comprising a ski having at least one mounting arm extending from the framework, wherein the ski is an adjustable ski that is adjustable amongst a plurality of inclination angles to an angle of inclination.

13. The track assembly of claim 12, wherein the at least one mounting arm has first and second mounting holes, wherein one of the first and second mounting holes has an elongated slot that allows the ski to be rotated to adjust the inclination angle.

\* \* \* \* \*